Nov. 9, 1954
L. E. CALKINS
2,694,027
METHOD FOR BONDING ELEMENTS TOGETHER
Filed May 5, 1952
2 Sheets-Sheet 1
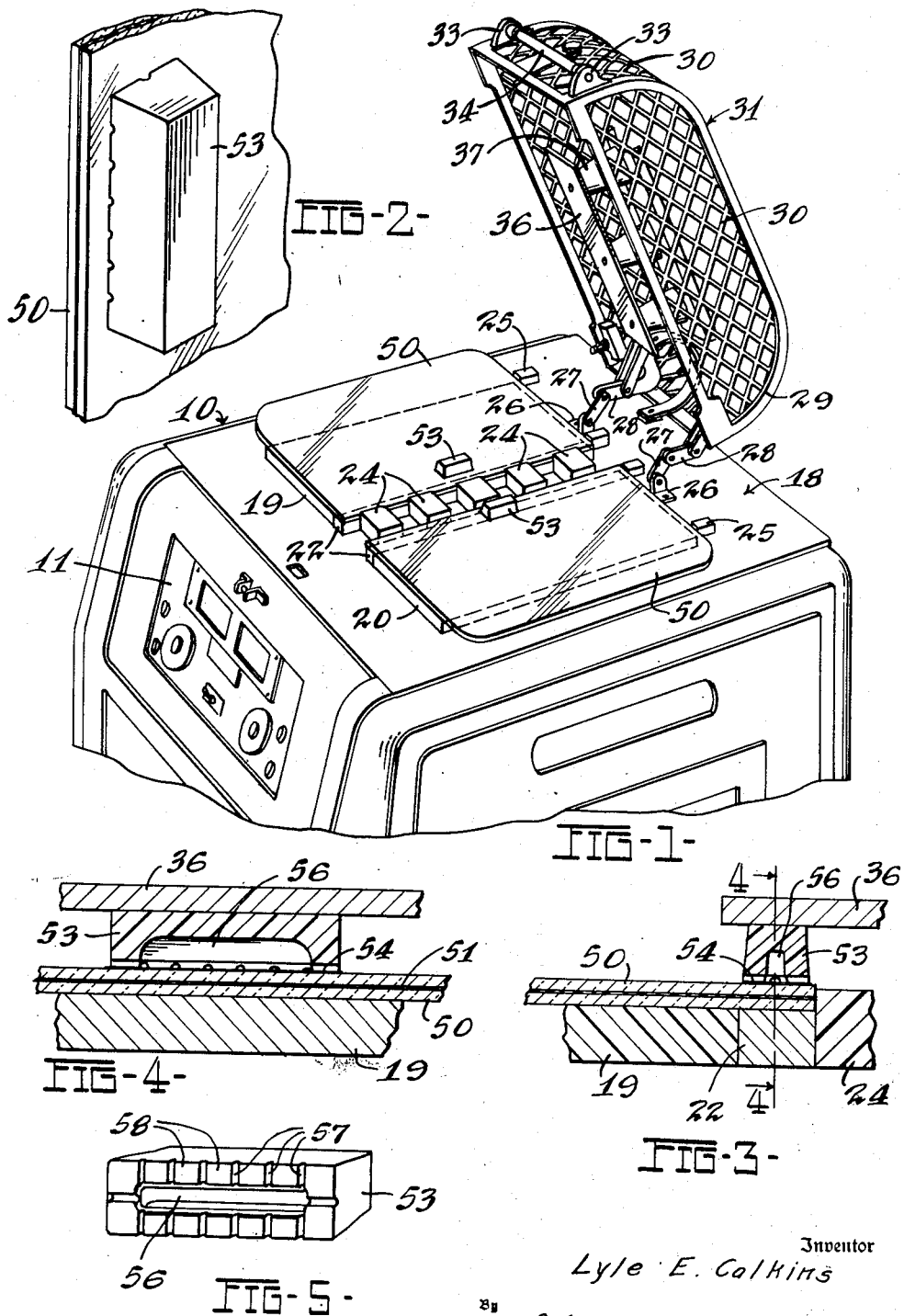
Inventor
Lyle E. Calkins
By
Harry O. Ernsberger
Attorney Nov. 9, 1954  L. E. CALKINS  2,694,027
METHOD FOR BONDING ELEMENTS TOGETHER
Filed May 5, 1952  2 Sheets-Sheet 2
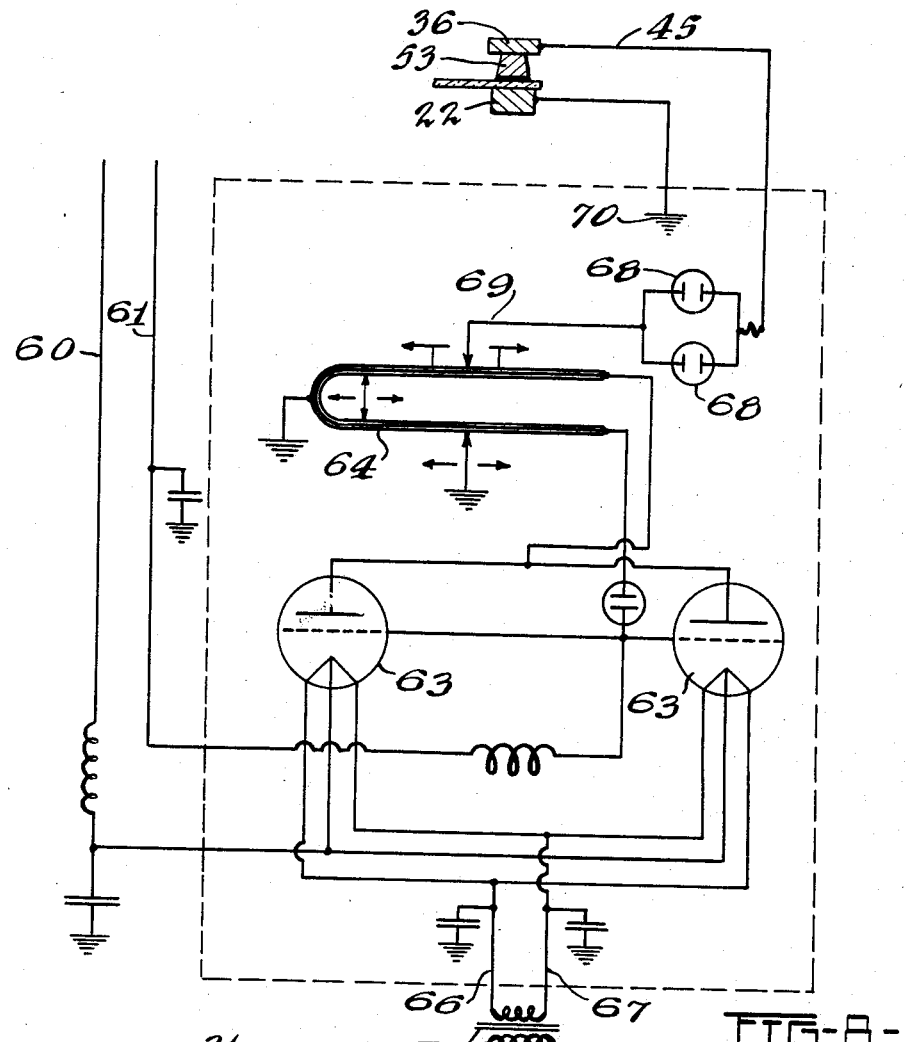
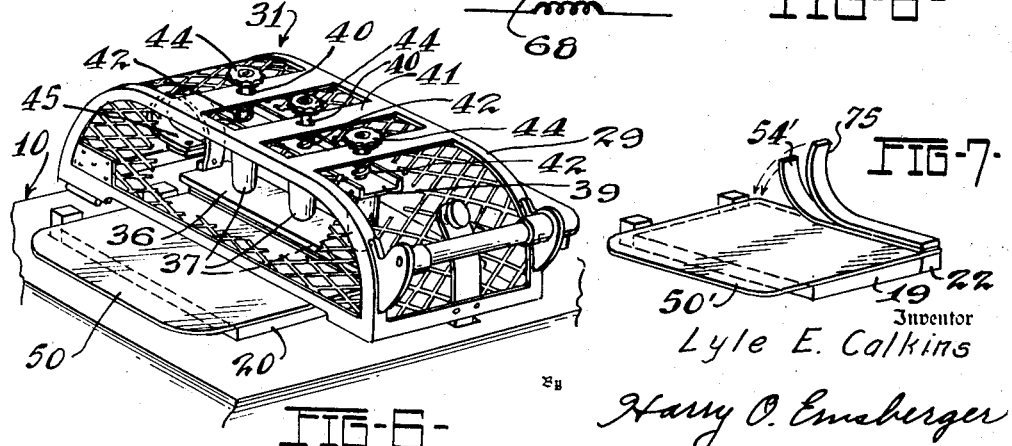
Inventor
Lyle E. Calkins
Harry O. Ernsberger
Attorney

United States Patent Office 2,694,027
Patented Nov. 9, 1954

2,694,027

METHOD FOR BONDING ELEMENTS TOGETHER

Lyle E. Calkins, Toledo, Ohio, assignor, by mesne assignments, to Bank of America National Trust and Savings Association, a national banking association Application May 5, 1952, Serial No. 286,148

1 Claim. (Cl. 154—118)

This invention relates to a method and process of bonding nonmetallic elements or members together through the utilization of radio frequency currents of comparatively high frequency and to the composite article produced by said method or process. The invention comprehends a method or process of bonding or securing nonmetallic elements to glass or the like by dielectric heating through the utilization of comparatively high radio frequency currents and is a division of my copending application Serial Number 53,445, filed October 8, 1948.

An object of the invention resides in a method or process of bonding a nonmetallic element to a nonmetallic panel such as for example glass or the like utilizing high frequency radio currents whereby the high frequency currents set up a molecular change in the bonding medium whereby the bonding medium is rapidly fused into bonding relation with element and panel to which it is to be secured.

Another object of the invention resides in the provision of a method and process of bonding resinous plastic elements to glass panels or the like in which the bonding heat is produced by radio frequency currents of high amplitude wherein the bonding operations may be rapidly accomplished and the process rendered practical for mass production operations.

Another object of the invention resides in the production of a composite unit wherein a nonmetallic element is bonded to a second nonmetallic element.

Another object of the invention resides in the provision of a panel unit wherein a grip member formed of resin is bonded to a panel formed of glass or the like.

Still a further object of the invention is the product of a panel unit wherein a grip member of nonmetallic material is secured to a glass panel or the like by a comparatively low-temperature, thermofusible bond.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a perspective view illustrating an apparatus for carrying out the method and process of my invention in the production of a composite panel assembly;

Figure 2 is a fragmentary isometric view illustrating the position of the grip member or projection secured to the panel;

Figure 3 is a sectional view through the panel and grip unit illustrating the electrodes of a high frequency oscillator in contact therewith;

Figure 4 is a detail sectional view taken substantially on the line 4—4 of Figure 3;

Figure 5 is an isometric view of the resinous grip member per se;

Figure 6 is an isometric view showing the electrodes of the oscillator in operative position;

Figure 7 is an isometric view showing an arrangement of weather seal or schlagle arranged to be bonded to a panel, and Figure 8 is a diagrammatic view illustrating the oscillator circuit of the high frequency generator utilized in carrying out the method and process of my invention.

While I have illustrated an apparatus for carrying out the method and process of bonding resinous plastic articles to glass panels and bonding nonmetallic weatherstrips or schlagles to glass or to other nonmetallic panels, it is to be understood that I contemplate the utilization of my process for bonding various nonmetallic elements together.

Referring to the drawings in detail, and first with respect to Figure 1, there is illustrated a housing or cabinet 10 which encloses the high frequency generator and oscillator for producing radio frequency currents utilized in producing the fusing heat for the bonding or adhesive medium. The cabinet is provided with a combination instrument supporting and control panel 11 which carries the instruments and switches for indicating the various electrical factors and for controlling the operation of the machine.

The cabinet is formed with a substantially horizontal platen 18 upon which is mounted a pair of plates 19 and 20 which are of nonmetallic materials such as the suitable resinous plastic having a comparatively low power factor.

Disposed adjacent the inner edge of each of the plates 19 and 20 are electrodes or capacitor bars 22 fabricated of metallic nonmagnetic material, as for example, aluminum. The bars or electrodes 22 are arranged in spaced relation by means of spacing blocks or members 24 which serve as abutments or positioning means for determining the position of elements which are to be bonded together. The electrodes 22 which are also referred to as capacitor plates are connected to a ground connection 70 forming a part of the oscillator circuit shown in Figure 8.

The other electrode or capacitor plate which is subjected to high radio frequency potential is movably supported upon the cabinet 10 and above the platen 18 so as to facilitate the positioning and removal of parts or elements to be bonded together. This arrangement is inclusive of brackets 26 to which are pivotally connected links 27, the latter being pivotally connected through arms 28 to a skeleton frame 29. The frame 29 forms part of a cage 31, the side and upper walls of which are formed of open mesh grid configuration 30 as shown in Figure 1, the grid or mesh material being formed of nonmagnetic metal which functions as a shield or screen to prevent radiation of high frequency radio waves away from the machine during bonding operations. The frame 29 is provided with forwardly extending projections 33 which support a handle 34 of nonmetallic material, which handle may be gripped by the operator to swing the cage to operative and nonoperative positions.

Disposed within the cage 31 is the upper capacitor plate or electrode 36 which is mounted upon the lower extremities of insulators 37 as shown in Figure 1. Disposed adjacent the other extremities of the insulators 37 is a channel-shaped member 39 which is provided with openings to accommodate rods 40, the latter extending into and are secured to the insulators 37. Surrounding each of the rods 40 and disposed between transverse bars 41 of the frame 29 and the channel-shaped member 39 are expansive coil springs 42 which serve to resiliently urge the capacitor plate 36 into engagement with the element to be bonded to a panel when the cage 31 is in operative position as illustrated in Figure 6. The extent of relative movement of the capacitor plate 36 with respect to the cage 31 may be adjusted or limited by means of manually operable hand wheels 44 which have internally threaded openings cooperating with threaded upper extremities of the rods 40. Through adjustment of the hand wheels 44, the maximum relative position of movement of capacitor plate 36 may be determined so that the parts will not become dislodged during relative movements of the cage 31. The capacitor plate 36 is connected by means of a flexible bus bar 45 to the oscillator circuit.

I have found the arrangement of my invention particularly adaptable in bonding resinous plastic members or elements to panels formed of glass or similar nonmetallic material. One of the particular uses of the invention is to bond hand grips or blocks of resinous plastic material to glass panels for installation in vehicle constructions. As shown in the drawings, a glass panel 50 preferably of the laminated or "safety" type in which sheet 51 of nonmetallic material is secured between two sheets of frangible material such as glass is placed upon the supporting plate 19. If it is desired to perform operations upon two panels simultaneously, a second panel 50 is positioned upon the supporting plate 20 as shown in Figure 1. A grip member or block 53 is then positioned upon the upper surface of each of the panels 50 and a strip of fusible bonding material 54 is interposed between each block 53 and the upper surface of the glass panel 50. The relative positions of these elements is shown in Figures 2, 3 and 4. The cementitious or bonding material may be of any suitable composition having a comparatively high loss factor whereby the same will become heated and fuse under the influence of the passage of radio frequency oscillations or waves through such material. While any suitable bonding material or tape may be employed for this purpose, I have found that a cementitious or bonding material formed of a combination of phenolic resin and Buna N resins has been found to function satisfactorily as a fusible bonding agent which may be fused through the application of radio frequency oscillations. While I have found that the blocks or elements 53 may be formed of various types of plastic or polymeric resins, I preferably used blocks formed of melamine formaldehyde. I have found that the bonding material of the character mentioned herein becomes fusible at approximately 300° F. I do not wish to limit the scope of my invention to any particular bonding material as any adhesive that can be cured or fused with heat may be employed. I have found that a radio wave frequency of 40 megacycles per second operates very satisfactorily to fuse the bonding material so as to join the plastic block 53 to the glass panel, but I contemplate the utilization in various applications of my invention of frequencies ranging from 10 to 100 megacycles per second.

As particularly shown in Figures 3, 4 and 5, the plastic block 53 is provided with a hollow interior 56 and the surface in engagement with the bonding material 54 is preferably formed of transversely arranged shallow grooves 57. The lands 58 adjacent the grooves 57 provide the surface for adhesion to the bonding material 54. I have found that by providing a series of grooves 57, moisture vapor or steam that may be formed during the heating of the bonding strip 54 may escape through the grooves 57. The recess 56 formed in the interior of the plastic block or knob 53 provides a means of reducing the effective cross-sectional area of the block so as to substantially eliminate the presence of uncured core in the curing or polymerization of the resinous element wherein a central core which may not have been completely cured in the initial molding or formation of the element would be influenced by the generation of heat formed during the bonding operation causing further curing which results in cracking or breakage of the resinous plastic elements. This is due to the difference in electrical resistance which causes the less dense uncured portion to have a higher power loss than the cured portion of the resin material. I have found that this difficulty may be readily obviated by reducing the cross-section area through the provision of a suitable recess 56.

Any suitable form of generator for producing high frequency oscillations may be employed. As illustrated in Figure 8, the oscillator circuit is shown as connected with a current supply line designated 60—61. The oscillator circuit illustrated comprises a plurality of tube generators 63 which are in circuit with a suitable tuning unit 64, the latter being arranged for resonance adjustment to the desired megacycle frequency. The plate elements of the tube generators 63 are supplied with high voltage and adequate current through the input line 60 and the return ground circuit of the tuning unit 64. The filament circuits of the tube generators 63 are energized through the filament energizing lines 66 and 67 through a suitable transformer 68, the latter being connected to a suitable source of electric energy. The upper electrode or capacitor plate 36 is connected through the bus bar 45 and coupling condensers 68 with the output circuit 69 of the resonance tuning unit 64. The circuit is completed through the grounding of the lower capacitor plate 22 as illustrated at 70 in Figure 7.

A typical example of bonding operations carried out on the machine is as follows:

With the movable cage 31 housing the upper capacitor plate 36 in elevated position as shown in Figure 1, the operator places the panels 50 of glass or other nonmetallic material on the platens 19 and 20 with the inner juxtaposed edged portions of the panels disposed above the lower capacitor plates or electrodes 22. The panels 50 are properly positioned by engagement with the abutment blocks 24 and 25. The operator then places a strip of bonding material 54 on each panel above a capacitor plate 22 and positions the knobs or blocks 53 of resinous plastic material on the strips of bonding material, the plastic knobs or blocks being arranged as shown in Figure 2. The operator then grasps the handle 34 of the cage or grid 31 and swings the latter downwardly until the capacitor plate 36 is in physical contact with the plastic knobs 53 as shown in Figures 3 and 4. Immediately upon the engagement of the capacitor plate 36 with the knobs 53, the radio frequency generator is automatically energized by suitable relay mechanism (not shown) which sets up or generates high frequency radio waves or oscillations which travel from the capacitor plate 36 through the knobs 53, bonding tape 54 and glazed panel 50 to the lower electrodes or capacitor plates 22. The plastic knob and glass panel have a low loss factor while the cement or bonding strip or tape 54 has a comparatively high loss factor. Under the influence of the oscillations or waves traveling between the capacitor plates 36 and 22, the bonding material or tape is heated by the internal stress and chemical reactions set up in the molecular structure of the bonding material under the influence of the radio frequency oscillations while the plastic knobs and glass panels being of low loss factor are not appreciably heated during the operation. I have found that a bonding material which fuses at approximately 300° F. or higher temperatures provides, upon cooling, a very satisfactory bond between the resinous plastic knobs and the panels. In fact, the bonding is of such a tenacious character that under actual tests the panel will be fractured before the bond is disrupted. The capacitor plate 36 is maintained in engagement with the plastic knobs until fusion of the bonding material completed, this period of time being determined by the length of time that the oscillator is in operation, this being controlled by timing means (not shown) contained within the machine housing 10. This timing means is of conventional type and may be adjusted to vary the length of time that the oscillator is in operation to produce high frequency oscillations passing from the capacitor plate 36 to the plates 22. In the specific example of bonded elements herein disclosed, I have found that duration of the fusing current is approximately twenty-five seconds at a frequency of forty megacycles. The time factor varies, however, with the cross-sectional size of the elements and bonding material and the character of the bonding material depending upon the loss factor of the materials. After the fusing cycle is completed and the oscillator circuit automatically turned off (the latter condition being indicated to the operator by means of a pilot light or signal on the instrument panel of the machine 10) the operator swings the cage 31 through the medium of the handle 34 to its open position as shown in Figure 1 after which the panels 50 with the knobs 53 fused or bonded thereto may be removed from the machine.

I have also found that the arrangement of my invention is particularly adaptable for bonding a nonmetallic weatherstrip or schlagle to a glass or frangible panel in the same manner that the plastic knobs are bonded to panels. As shown in Figure 6, a glass panel 50' is disposed on the platen 19, a strip of bonding material 54' being disposed on the upper surface of the panel 50' and in alignment with the lower capacitor plate or electrode 22. A length of felt or other nonmetallic weatherstrip or schlagle 75 is placed in engagement with the strip of bonding material 54'. The operation of fusing or bonding the weatherstrip 75 to the panel 50' is carried out in the manner above-described in connection with the bonding of resinous knobs to the frangible panels. The capacitor plate 36 is swung into contact with the weatherstrip 75 and as the latter is of a low power factor it will not be excessively heated during the heating and fusing of the bonding material 54'.

While I have illustrated resinous elements and weatherstripping bonded to frangible or glass panels, it is to be understood that I contemplate the fabrication of assemblies of other nonmetallic elements in bonded relation with nonmetallic panels.

What I claim is:

A method of bonding a low loss factor glass panel to a low loss factor piece of lesser area, which consists in recessing the underside of the piece to reduce the effective cross-sectional area so as to substantially eliminate the presence of uncured core in order to avoid cracking of the piece during the bonding operation, forming grooves in the piece on the underside thereof which, when the piece is being bonded to the glass panel, connect the recess with the atmosphere in order to provide means for permitting the moisture occurring between the panel and the piece during the bonding operation to escape, positioning a heat curable high loss factor bonding agent between the glass panel and the piece, disposing the glass panel and the piece between two electrodes connected to a high frequency current generator, engaging one electrode with the glass panel and the other with the piece, and then energizing the electrodes with high frequency current whereby the current heats the bonding agent to bond the glass panel to the piece.

References Cited in the file of this patent

UNITED STATES PATENTS

| Number | Name | Date |
| --- | --- | --- |
| 2,434,573 | Mann et al. | Jan. 13, 1948 |
| 2,575,251 | Arnold | Nov. 13, 1951 |